United States Patent [19]
Perez

[11] Patent Number: 4,702,290
[45] Date of Patent: Oct. 27, 1987

[54] CONTAINER FOR COLLECTING OIL

[76] Inventor: Fernando Perez, 5101 SW. 139 Ct., Miami, Fla. 33175

[21] Appl. No.: 929,100

[22] Filed: Nov. 10, 1986

[51] Int. Cl.[4] ...................... B65B 39/00; B67C 11/04
[52] U.S. Cl. .................................. 141/332; 141/364; 141/384; 206/216; 220/1 C; 220/94 R; 220/367; 220/378
[58] Field of Search ............... 206/223, 216; 141/106, 141/331, 332, 364, 384; 184/1.5, 106; 220/1 C, 91, 94 R, 367, 378; 222/548, 556, 572

[56] References Cited

U.S. PATENT DOCUMENTS

| | | | |
|---|---|---|---|
| 421,732 | 2/1890 | Lewis et al. | 220/367 |
| 421,754 | 2/1890 | Pannill | 141/106 |
| 583,000 | 5/1897 | McCarty | 220/378 |
| 987,518 | 3/1911 | Wendling | 141/384 |
| 1,073,740 | 9/1913 | Coonley | 220/94 R |
| 2,858,050 | 10/1958 | Barnard | 141/331 |
| 4,524,866 | 6/1985 | Pollacco | 206/223 |
| 4,600,125 | 7/1986 | Maynard, Jr. | 141/331 |

*Primary Examiner*—Jimmy G. Foster
*Attorney, Agent, or Firm*—Jesus Sanchelima

[57] ABSTRACT

A container for collecting oil that has a cover and a valve assembly to control the drawing of the collected oil into a household container, such as a plastic milk container. A support assembly is provided to hold the oil filter over the valve assembly so that it can also be drained. A threaded portion on the spout of the valve assembly insures a spill free pouring of the oil.

7 Claims, 4 Drawing Figures

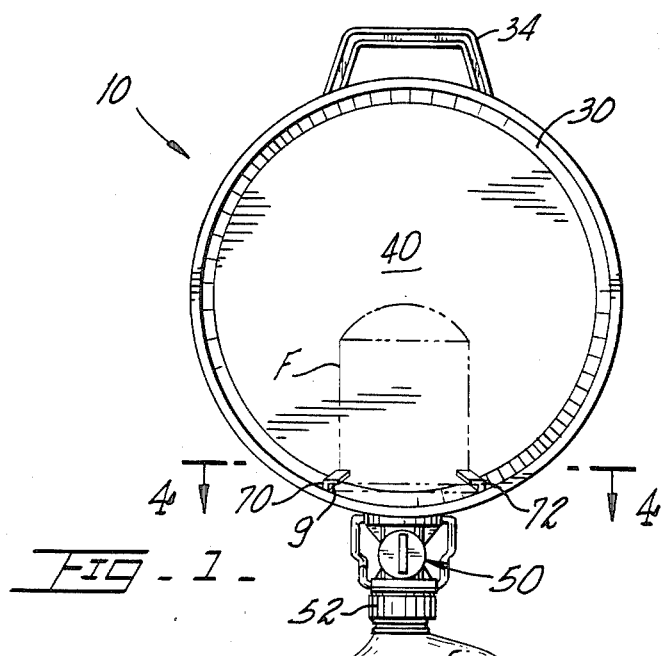
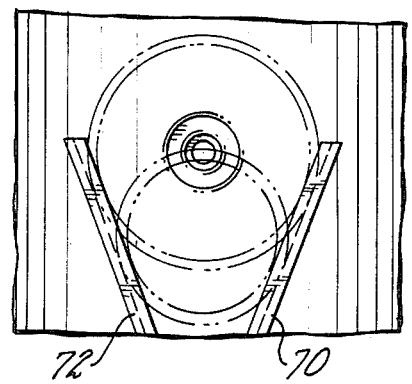
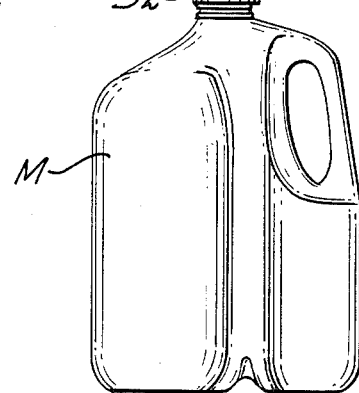
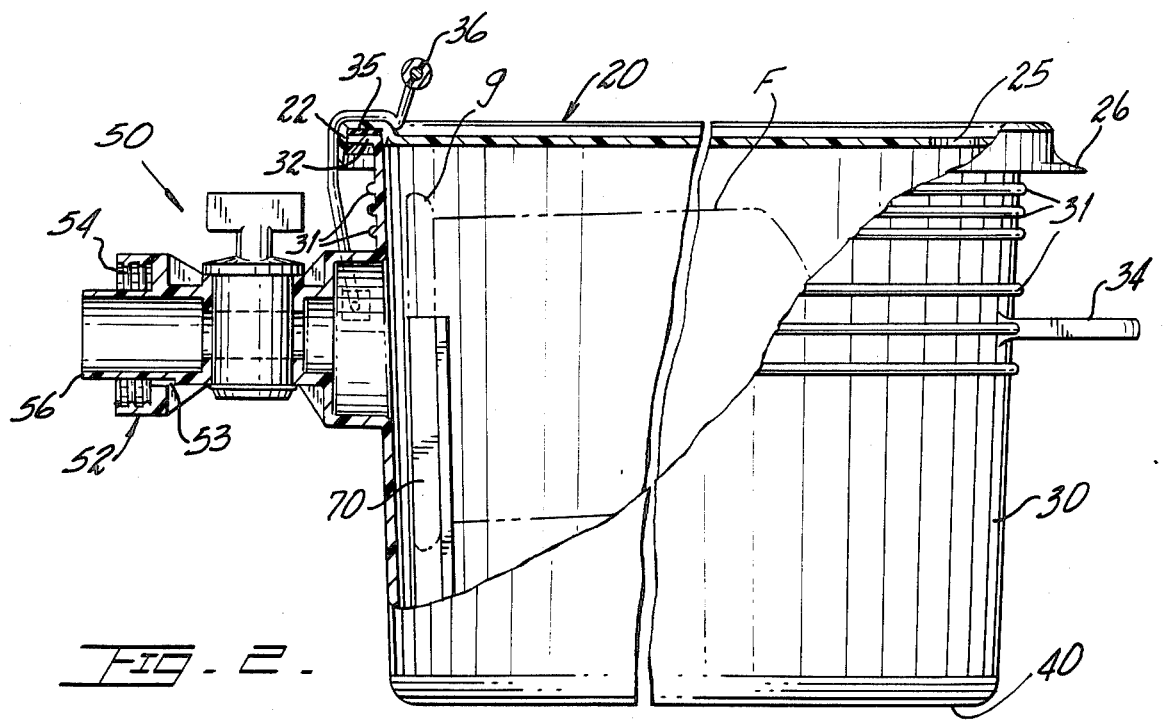

CONTAINER FOR COLLECTING OIL

BACKGROUND OF THE INVENTION

1. Field of the Invention

The present invention relates to oil collectors, and more particularly, to such collectors that include valved controls.

2. Description of the Related Art

The proper disposal of oil from automobiles' crankcases has become an ever increasing problem for the environment. Our drinking water is endangered and compliance with the pertinent laws will be more closely observed in the future.

Applicant believes that the closest reference corresponds to U.S. Pat. No. 4,524,866 issued to Pollaco where the problem has been documented. However, it differs from the present invention because it requires cleaning of the pan 14 and it does not have a liquid tight cover. Furthermore, this invention is primarily to an oil catch pan as a self-supporting structure that includes a closure on the bottom wall that is pierced or opened to allow the collected oil out and poured in a jug. However, this pan is apparently designed as a disposable throw-away kit and the piercing or opening of the closure would more than likely become a messy proposition.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a container for collecting oil that is simple to use and clean while at the same time the user may control the outflow of the collected oil and use household disposable containers to store the oil until it can be properly disposed.

It is another object of this invention to provide a container for collecting oil that can be transported without spilling its contents.

It is still another object of this invention to provide an oil collecting container that is removably mountable to a household container, such as a plastic milk container, and allowed to drain out the collected oil and the oil inside the oil filter.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational view of the oil collector without the cover and resting on a plastic milk container where the oil collected is going to be poured.

FIG. 2 shows a partial cross-sectional view of the collector with the cover on.

FIG. 3 illustrates a detail view of the rim of the wall of container for collecting oil and the edge of the cover.

FIG. 4 shows a patial cross-section taken along line 4—4 in FIG. 1.

DETAILED DESCRIPTION OF THE PREFERRED EMBODIMENT

Referring now to FIG. 1, it can be observed that the present invention is generally referred to with numeral 10 and it is shown without cover 20 that is shown in FIG. 2.

Oil collecting container 10 has a peripheral wall 30 and a bottom member 40, as shown in FIG. 2. The capacity of container 10 is sufficient to hold the oil contained in the crankcase. Wall 30 includes, in the preferred embodiment, several strengthening ribs 31 that prevent deformation of wall 30. Wall 30 ends with an outwardly extending flange 32 that cooperates with peripheral receiving skirt member 22 of cover 20 to provide a liquid leak proof closure. A shoulder 23 is provided, in the preferred embodiment to insure the locking in place of cover 20. A peripheral skirt 27 is provided to insure an oil-tight seal. Cover 20 includes opening 25 that allows the air in to occupy the space left by oil drained. A lip 26 is provided to facilitate the opening of cover 20. A gasket member 35 is sandwiched between flange 32, cover 20 and skirt 22 gasket 35 is intended to prevent the leakage of the oil collected. Gasket 35 is preferably made out of a material that is not attacked or deteriorated with exposure to oil, such as neoprene. A handle 34 is mounted on the outer surface of wall 30 to facilitate the handling and transportation of collector 10. Handle 36 is hingedly mounted on wall 30, or as shown in the preferred embodiment on the body of valve assembly 50.

Valve assembly 50 is preferably located on the outer surface of wall 30 and opposite to the location of handle 34. In FIG. 2 valve assembly 50 is shown to be integrally built on wall 30 and it is designed so that a user may control the oil that is being poured out of container 10. The specific type of valve used is not critical as long as the user is allowed to control the outflow of the collected oil, such as a gate valve. Valve assembly 50 includes a termination 52 that has a threaded portion 54 that is, in the preferred embodiment, compatible with the outer thread portion commonly found in conventional plastic milk containers. Also, a guiding spout 56 insures that the oil will not leak out accidentally. A relief port 53 is included to allow the air inside container M out.

Supporting rails 70 and 72 are mounted inside wall 30, preferably over valve assembly 50, to cooperatively receive oil filter F that conventionally includes a flange G that fits between rails 70 and 72 and the inner surface of wall 30. In the preferred embodiment, supporting rails 70 and 72 converge towards each other so that they may accept filters F of different diameters. Other means for supporting conventional oil filters may be used but the idea is to allow the user to position the old filter F in such a way that the oil it contains is also drained out.

Usually, you need two conventional milk containers M to dispose of the oil collected from the average automobile crankcase: 5 quarts. A user should prudently not fill completely either one of the milk containers. The last milk container M may take longer to fill since container 10 should be left mounted over milk container M long enough to allow gravity to drain the oil completely. Filter F will be mounted inside container 10 when filling the second container M.

To use container 10, cover 20 is removed and valve assembly 50 is closed. Container 10 is positioned below the crankcase after the old car's oil filter is removed and installed inside container 10 so that it is filled with oil. Then cover 20 is placed over container 10. Conventional container M is then screwed on to valve assembly 50 horizontally and then container 10 is lifted and held in vertical position by container M. Next, valve 50 is opened to allow the oil out until container M is filled. Valve 50 is closed and another container M replaces the one that was filled. This second container M needs extra time for filter F to completely drain out by gravity.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A container for collecting oil from the crankcase of automobiles and for draining the oil filter, comprising:
   A. container means having a bottom member and a peripheral wall upwardly extending from the outer edge of said bottom member and said wall having inner and outer surfaces;
   B. cover means cooperatively and removably mounted over said wall thereby providing liquid tight sealing of said container means and said cover means including an opening; and
   C. valve means mounted on said wall so that said oil may be controllably drained out;
   D. first handle means mounted on said wall opposite to said valve means; and
   E. support means mounted on the inner surface of said wall and adapted to hold in place said oil filters and said support means being mounted substantially where said valve means is located.

2. The container set forth in claim 1 wherein said valve means includes a threaded termination.

3. The container set forth in claim 2 wherein said threaded portion is compatible with the threaded portion of plastic milk containers.

4. The container set forth in claim 3 wherein said valve means includes a tubular spout coaxially disposed within said threaded portion and extending outwardly beyond said threaded portion.

5. The container set forth in claim 4 wherein said support means includes a pair of rail members that converge towards each other to accept said oil filters of different diameters.

6. The container set forth in claim 5 wherein said valve means includes a relief port to allow the air through.

7. The container set forth in claim 6 further including second handle means mounted on said wall opposite said first handle means.

* * * * *